United States Patent [19]
Villanueva et al.

[11] Patent Number: 4,756,454
[45] Date of Patent: * Jul. 12, 1988

[54] STEREOPHONIC AUDIO EQUIPMENT CARRIER

[75] Inventors: Xavier R. Villanueva; Sergio E. Villanueva, both of San Ysidro, Calif.

[73] Assignee: Novi, Inc., San Diego, Calif.

[*] Notice: The portion of the term of this patent subsequent to May 5, 2004 has been disclaimed.

[21] Appl. No.: 781,890

[22] Filed: Sep. 30, 1985

Related U.S. Application Data

[63] Continuation-in-part of Ser. No. 672,936, Nov. 19, 1984, abandoned.

[51] Int. Cl.⁴ .................................................. B62J 7/00
[52] U.S. Cl. ...................................... 224/30 A; 224/41
[58] Field of Search ..................... 224/30 A, 36, 41, 37, 224/38, 30 R, 32 R, 42.42; 455/350, 351; 280/289 A

[56] References Cited

U.S. PATENT DOCUMENTS

| | | |
|---|---|---|
| 479,846 | 8/1892 | Sager . |
| 524,618 | 8/1894 | Stayman . |
| 579,761 | 3/1897 | Mayo ..................... 224/41 |
| 584,943 | 6/1897 | Lamson . |
| 585,108 | 6/1897 | Lamson . |
| 613,226 | 11/1898 | Adams . |
| 637,733 | 11/1899 | Hall . |
| 637,762 | 11/1899 | Buley et al. . |
| 652,325 | 6/1900 | McKnight . |
| 666,088 | 1/1901 | Deitz . |
| 882,346 | 3/1908 | Rosencrance . |
| 1,280,030 | 9/1918 | Hill ..................... 224/41 X |
| 1,512,875 | 10/1924 | Byam . |
| 1,908,535 | 5/1933 | Pawsat . |
| 2,109,315 | 2/1938 | Harley . |
| 2,341,608 | 2/1944 | Gey . |
| 2,401,245 | 5/1946 | Hobbs . |
| 2,588,671 | 3/1952 | Tringali . |
| 2,979,794 | 4/1961 | De Bartolo . |
| 3,193,232 | 7/1965 | Hatcher . |
| 3,403,878 | 10/1968 | Opay . |
| 3,598,295 | 8/1971 | Seegers . |
| 3,842,688 | 10/1974 | Baginski . |
| 3,947,954 | 4/1976 | Weiler . |
| 4,176,770 | 12/1979 | Griggs et al. . |
| 4,280,226 | 7/1981 | Jenkins . |
| 4,415,105 | 11/1983 | Jackson . |
| 4,436,350 | 3/1984 | Jolin . |
| 4,440,332 | 4/1984 | Kullen . |
| 4,445,228 | 4/1984 | Bruni ..................... 455/351 X |
| 4,447,934 | 5/1984 | Anscher . |
| 4,473,524 | 9/1984 | Paradis . |
| 4,532,679 | 8/1985 | Scott . |
| 4,541,555 | 9/1985 | Miree . |
| 4,662,547 | 5/1987 | Villanueva et al. ............... 224/30 A |

OTHER PUBLICATIONS

Page 19 of Motorcyclist Magazine, Aug. 1985, showing an ad for 'National Cycle' radio.

Primary Examiner—Henry J. Recla
Assistant Examiner—Robert M. Petrik
Attorney, Agent, or Firm—Baker, Maxham & Jester

[57] ABSTRACT

An audio equipment carrier with built-in speakers for personal portable radios, tape players and the like. The carrier is adapted to be clamped or otherwise mounted on the handlebars of vehicles such as bicycles, tricycles, mopeds and motorcycles. The speakers project rearwardly from the handlebars toward the rider and are on opposite sides of a front control arm or stem. The carrier has a generally flat top and the audio equipment is held thereon by a releasable strap. A plug and leads provide electrical communication between the audio equipment and the speakers. The carrier may be equipped with a battery and audio amplifiers to enhance the sound produced by the audio equipment. A novel strap and buckle combination is also disclosed.

30 Claims, 7 Drawing Sheets

STEREOPHONIC AUDIO EQUIPMENT CARRIER

CROSS REFERENCE TO RELATED APPLICATION

This is a continuation-in-part patent application Ser. No. 672,936, filed Nov. 19, 1984, now abandoned.

FIELD OF THE INVENTION

This invention relates generally to mounting brackets or carriers for releasably mounting portable audio equipment to other apparatus such as vehicles having a forward wheel controlled by a combination stem and handlebars, examples being bicycles, tricycles, mopeds and motorcycles.

DISCUSSION OF THE PRIOR ART

Operators of bicycles have heretofore had to do without audio entertainment unless they somehow carried audio equipment on their persons and used headphones to carry the sounds to their ears. Such an arrangement has been the typical way an operator could properly receive stereophonic sound, since for proper reception the operator should be equidistant from the two transducers which emit the audio.

In most states, the operator of a motorcycle cannot legally wear earphones because of the fact that earphones excessively attenuate ambient sounds, such as voices, horns and sirens. Safe driving laws require that the operator of a motor vehicle be aware of ambient sounds. Unfortunately, most states do not have the same restriction concerning bicycle riders. With the proliferation of personal portable, pocket size stereophonic audio equipment with earphones, the potential for dangerous situations is immediately apparent. There are many people, most notably children and teenagers, riding bicycles while wearing earphones.

In the absence of earphones, stereophonic equipment would need to be carried in front and centered, with respect to the operator, without inconveniencing the operator and without impairing the safe operation of the bicycle. One type of such apparatus exists where a combination radio with its speakers is removably mounted to the handlebars of a motorcycle. However, it is a rather sophisticated arrangement, much like an automobile radio installation, except that the housing for the radio and its associated speakers is mounted on rods some distance above the handlebars. It uses the motorcycle power supply and is essentially a self contained, semi-permanent radio and speaker console. There has not previously been a practical and safe means adapted to couple an independent personal portable radio or tape player to a bicycle to provide adequate stereophonic sound without the need to use earphones.

Other examples exist for clamping portable radios to a bicycle or motorcycle.

SUMMARY OF THE INVENTION

A purpose of this invention is to provide a bicycle rider with a means for listening to stereophonic audio without the need for earphones and without attenuating ambient sounds. A resultant advantage is that a bicycle rider can have stereophonic entertainment without the potential safety impairment that would be caused by the use of earphones.

The invention will be described as it mounts and functions on a bicycle, but it applies equally well to any of the aforementioned vehicles having a forward wheel controlled by a combination stem and handlebars. As used herein, the term "audio equipment" refers to apparatus capable of producing electric signals which can be converted to audible sounds. "Personal portable stereo" may be a radio, tape player or a combination of both. It is normally pocket size and frequently has no speakers, only headphones.

This invention is an audio equipment carrier for vehicles of the type mentioned above. It primarily comprises a main body adapted to be removably affixed to the handlebars in a laterally centered position, a pair of speaker enclosures affixed to the main body, each housing a speaker, a releasable means for securing the audio equipment to the main body and a means for connecting the audio equipment to the speakers. That portion of the main body which is adapted to receive the audio equipment is a generally horizontal, substantially planar surface at the top of the main body. The audio equipment is held in place on the carrier by means of a strap. A novel strap and buckle arrangement is disclosed which is adjustable to accommodate any appropriate size and shape audio equipment. It allows the audio equipment to be secured to or released from the carrier with one hand.

Another significant feature of this invention is that it is adaptable. It can be used in combination with many portable radios and tape players without modification. Furthermore, the audio equipment can be easily mounted to and removed from the carrier to prevent theft of the equipment. When parking the bicycle, the user can simply remove and carry the audio equipment until he or she returns to the bicycle.

A further advantage of this invention is that it is affixed to a bicycle in such a way as to not be a safety hazard, and is well balanced, even when audio equipment is mounted to the carrier. When mounted, with audio equipment, it is on the bicycle center line and its center of mass is directly over and very close to the handlebars to which it is mounted. Furthermore, this invention can be mounted virtually on all vehicles having a forward wheel controlled by a stem and handlebar combination.

By using the carrier of this invention, the audio equipment is positioned in front of and centered with respect to the operator, and earphones are not needed to properly receive stereophonic audio. Such an arrangement is highly advantageous with respect to safety.

BRIEF DESCRIPTION OF THE DRAWING

The objects, advantages and features of this invention will be more readily understood from the following detailed description, when read in conjunction with the accompanying drawing, in which.

DESCRIPTION OF THE PREFERRED EMBODIMENTS

Figure 1:
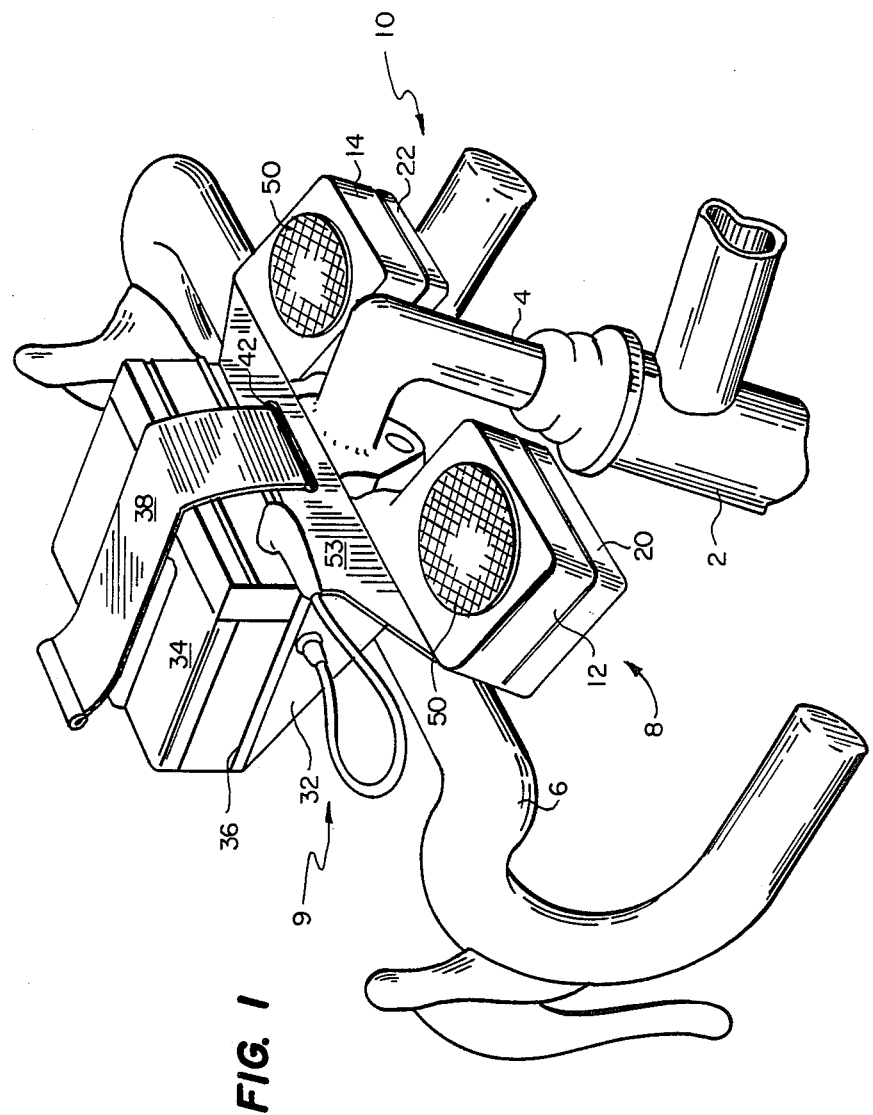
FIG. 1 is a pictorial view of one embodiment of the invention, including audio equipment, shown mounted on the handlebars of a bicycle.
Figure 6:
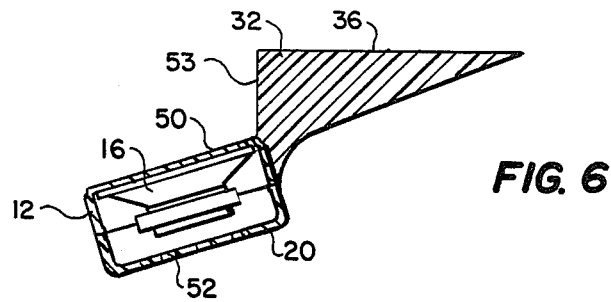
FIG. 6 is a section taken along line 6—6 of FIG. 4.
Figures 7, 8:
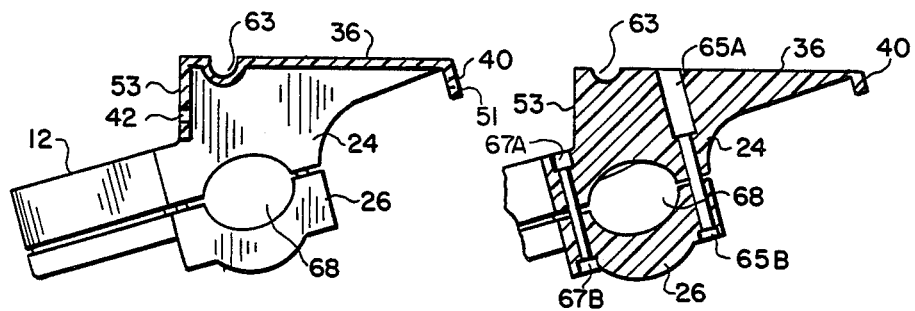
FIG. 7 is a section taken along line 7—7 of FIG. 4.
FIG. 8 is a section taken along line 8—8 of FIG. 4.
Figure 9:
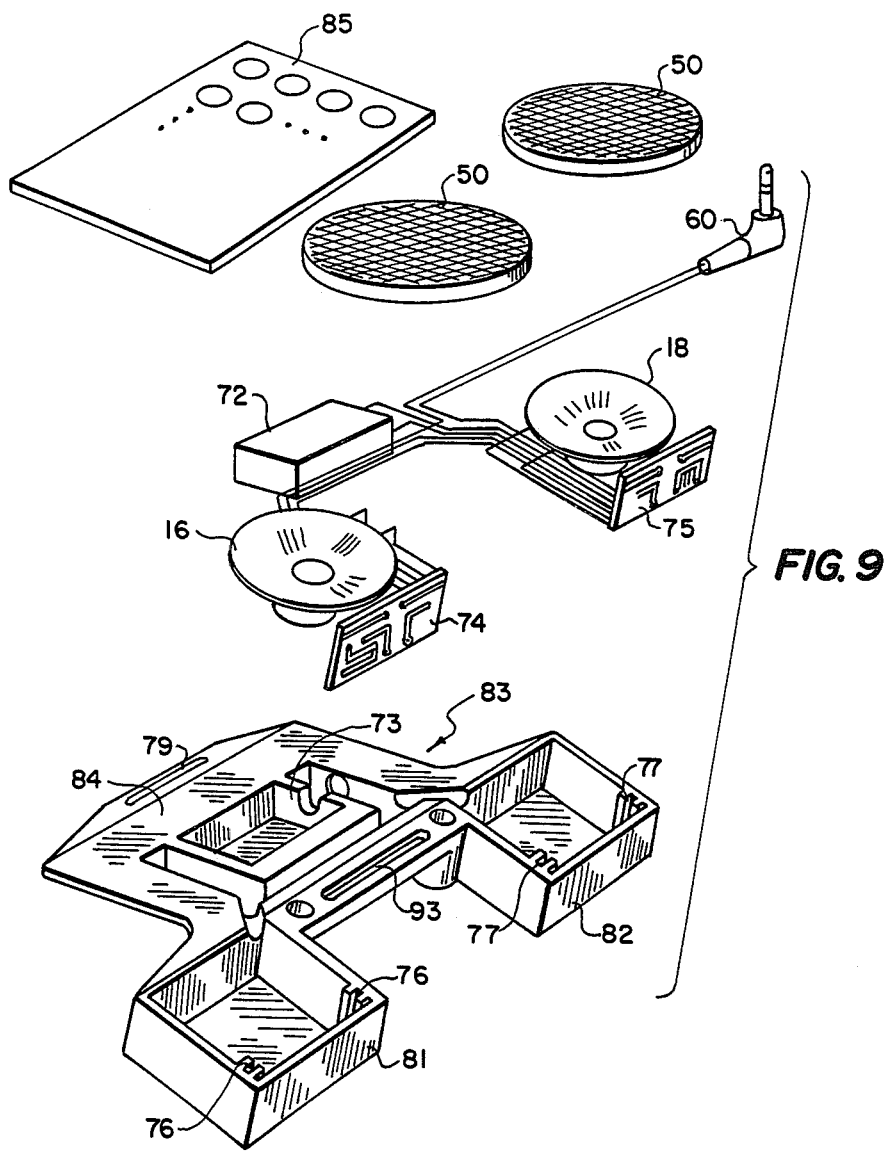
FIG. 9 is an exploded perspective, partial schematic view of an alternative embodiment of the invention.

Referring now to the drawing, and more particularly to FIGS. 1 and 6 thereof, front frame member 2 of a bicycle is shown having an upwardly extending L-shaped stem 4 to which are affixed handle bars 6 in known manner. The stem may have any shape, but the one shown is typical. Carrier 9 of the invention is mounted on the handlebars such that left speaker 8 is on the left side of stem 4 with reference to the operator, and right speaker 10 is on the right side of the stem. Left speaker 8 generally comprises left speaker enclosure 12 and left transducer 16. Right speaker 10 generally comprises right speaker enclosure 14 and a right transducer 18 (FIG. 9). Bottom portion 20 of the left speaker and bottom portion 22 of the right speaker are removable for inserting and maintaining the transducers. Preferably, each transducer has its diaphragm or cone made from a plastic film such as polypropylene or other suitable moisture proof material. The transducers receive electric signals from the audio equipment and convert them to audible sound waves (audio).

With reference to FIGS. 3-7, the invention is adjustably affixed to handlebars 6 by left and right clamps. Each clamp comprises two C-shaped halves which form an encircling clamp when joined. The left clamp is comprised of top half 24 and bottom half 26. The right clamp is comprised of top half 28 and bottom half 30. The top halves are preferably integral with main body 32 of the carrier, as will be explained, and the bottom halves are removably secured thereto by appropriate means such as bolts.

Figure 5:
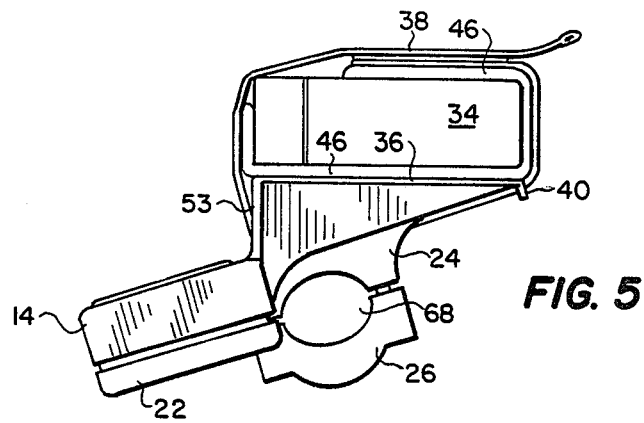
FIG. 5 is a side elevation of the invention of FIG. 1.

Audio equipment 34 is mounted on generally horizontal, substantially planar surface 36 of body 32 and held thereto by strap means 38, as shown in FIGS. 1 and 5. The strap can be a single piece of cloth or belting material, preferably elastic in nature, wrapped around surface 36 (through slots 40 and 42) and audio equipment 34 as shown. The ends of the strap may be releasably joined together by conventional means such as hook and pile fasteners. Alternatively, the strap may be a shorter piece anchored to main body slot 40 at one end and releasably coupled to the body at the other end by means of a suitable coupling or buckle assembly. An example of such a securing means will be later described. In any case, the strap tightly embraces the audio equipment between it and the top receiving surface of body 32.

Preferably main body 32 comprises surface 36, top clamp halves 24 and 28 and the speaker enclosures 12 and 14, all of unitary construction. It is adapted to mount on handlebars 6 such that the surface 36 is above and extends forwardly of the handlebars, the surface being laterally centered with respect to stem 4. The speakers are rearward of the handlebars and disposed on opposite sides of the stem, below surface 36. They are shown with a shallow tilt or declination toward the rider.

By securing the carrier of the invention close to the handlebars of the cycle, certain advantages are achieved. With the mass of the audio equipment and the carrier at that level, sudden acceleration or deceleration is not likely to cause a significant torque to be exerted on the combined unit which could cause it to rotate about the handlebars. On the other hand, by loosening the clamps, the rider can orient the speakers to face more or less rearwardly in accordance with his or her own preference. Also, by being close to the handlebars, it is much safer for the rider than if it were higher. The unit is so small and so low that it does not obstruct the rider's view. It has a minimum of protrusions, another safety factor, especially in cases of emergency stops or accidents.

Figure 2:
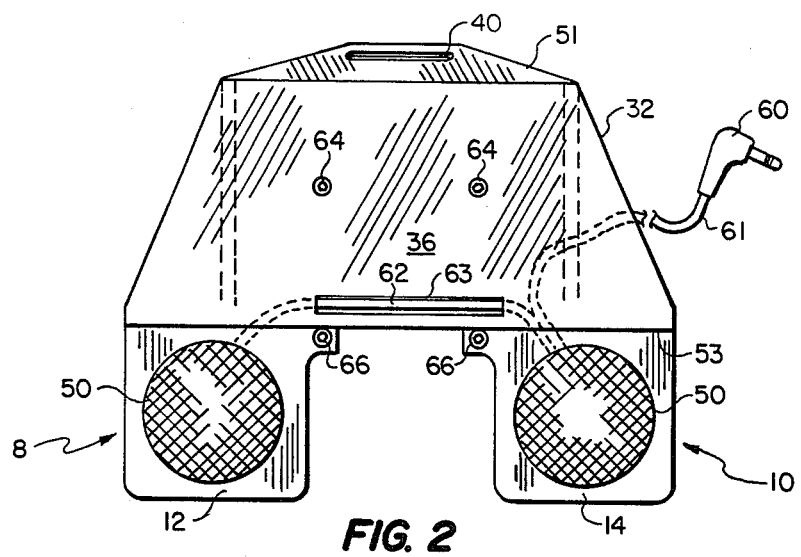
FIG. 2 is a plan view of the invention of FIG. 1 without the audio equipment.
Figure 3:
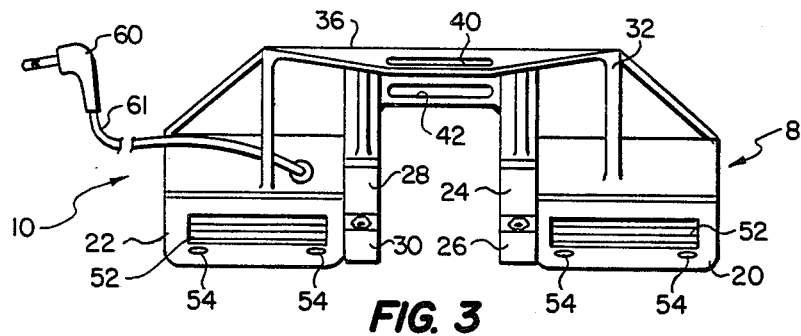
FIG. 3 is an elevation of the invention of FIG. 2 from the front.
Figure 4:
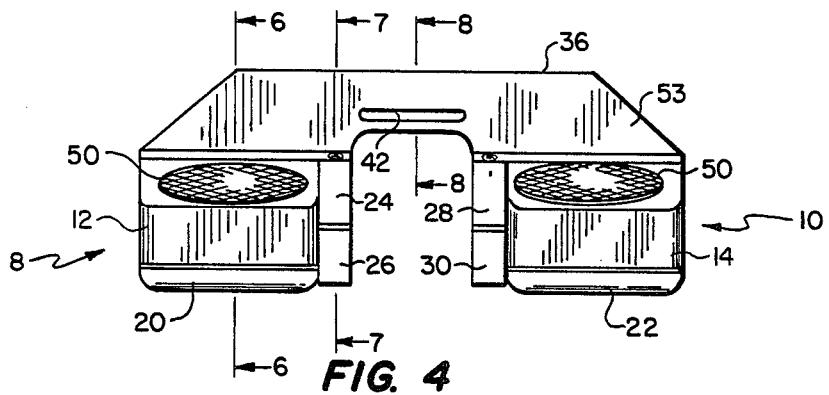
FIG. 4 is an elevation of the invention of FIG. 2 from the rear.

It can be appreciated from FIGS. 2-4 that not only does the configuration shown result in longitudinal symmetry of mass, it also contributes to its compactness. By being adjustable and flexible, strap 38 can accommodate a wide range of audio equipment sizes and shapes, and secure them to the carrier. The speakers are separated but partially in front of surface 36. If the speakers were the same distance from the rider as the audio equipment, the unit would be significantly wider or higher, thus partially defeating the low center of gravity designed into the invention.

By way of example as to its compactness, the carrier, without audio equipment, is generally about $7\frac{1}{2}$ inches (19 cm) wide, $5\frac{1}{2}$ inches (14 cm) deep and $1\frac{3}{8}$ inches (3.4 cm) thick. The audio equipment may range from the very small, thin versions, to the larger pocket size, a typical one of which has dimensions of about $5\frac{1}{4} \times 3\frac{1}{2} \times 1\frac{1}{4}$ inches ($13.3 \times 8.9 \times 3.2$ cm). The audio equipment can weigh up to one pound and balance is fully maintained.

Figure 10:
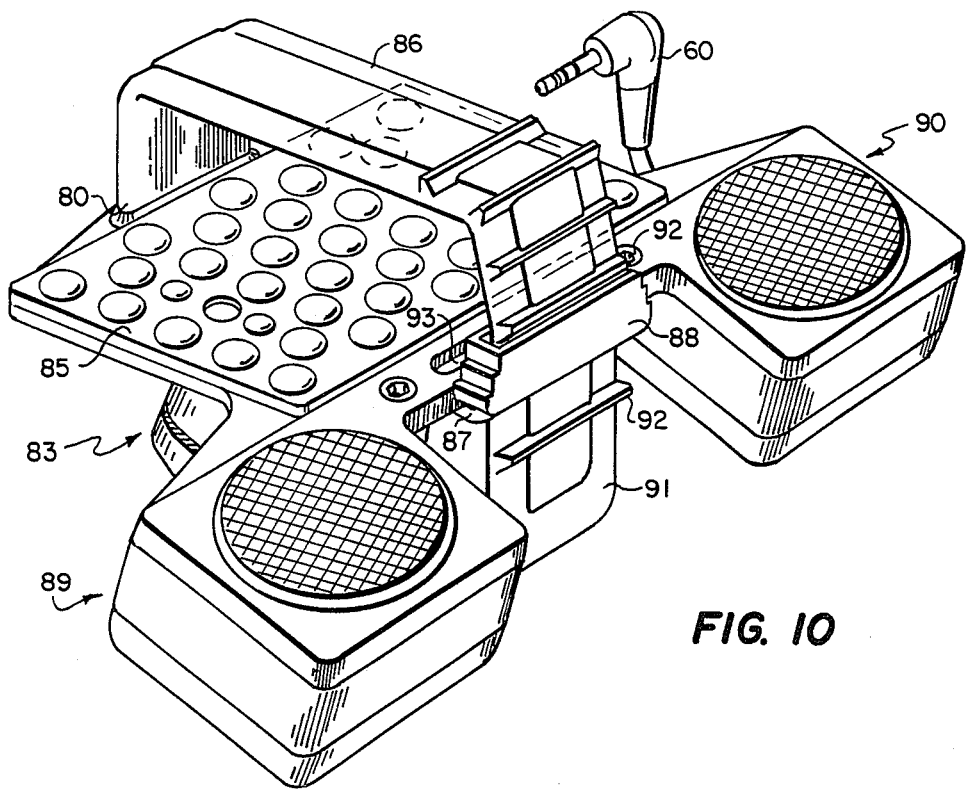
FIG. 10 is a perspective view of the embodiment of FIG. 9 in assembled form.

Surface 36 can be spaced somewhat above the tops of the speaker enclosures, as shown in FIGS. 1-8, or it can be roughly vertically contiguous with the speaker enclosures as shown in FIGS. 9 and 10. In both configurations the speaker enclosures are declined from the plane of surface 36 at an angle suitable for optimum projection of the audio to an operator when surface 36 is substantially horizontal. In the FIG. 1 configuration front strap slot 40 and back strap slot 42 are formed in the main body. The front slot is in angled plate 51 extending from surface 36 and the rear slot is in vertical face 53. Preferably, the strap slots are disposed at or near opposed margins of the surface 36. As shown in the drawing, the strap slots 40 and 42 are transverse with and spaced along the longitudinal axis of the bicycle to which the carrier is adapted to be mounted.

It would normally be desirable to have a resilient padding interposed between the audio equipment and the carrier of this invention to prevent damage to the audio equipment or possible detuning caused by vibrations. Padding 46 is shown in FIG. 5 and may wrap around a portion of the audio equipment or it may provide only a bottom surface.

Defined by or otherwise affixed to each of the speaker enclosures on its top side is a speaker grill or screen 50. The grills 50 protect the transducers but provide for optimum passage of sound. To remove rain water and other accumulative moisture, louvers 52 are formed in the speaker enclosure bottom portions 20 and 22 (FIG. 3). Also formed in each bottom portion may be a plurality of drain holes 54, if desired. As stated previously, the speakers themselves are moisture proof.

Transducers 16 and 18 are coupled in electrical communication with the audio equipment by typical means shown in FIG. 2 such as plug 60, lead 61 and second lead 62. Lead 61 contains wires for both speakers and lead 62 is simply a continuation of wires for left speaker 8. The leads pass through the main body via suitably disposed apertures and lead 62 passes below the plane of surface 36 through groove 63.

The clamp bottom halves 26 and 30 are joined to their respective top halves by a plurality of bolt means 64 which pass through recessed bores 65A and 65B, and bolt means 66 which pass through recessed bores 67A and 67B. Note from FIGS. 5, 7 and 8 that openings 68 defined by the clamps are somewhat oval in shape. Actually, they are formed from two combined diameters so that the clamps can easily accommodate different diameter handlebar tubing. These generally range between ⅞ inch (22.2 mm), and 1 1/16 inch (27 mm), but the invention is not so limited. The bolts preferably require a hex key to operate, thereby discouraging unauthorized removal of the unit from the bicycle.

This carrier is intended to function with self contained portable audio equipment. Typically these personal portable stereos do not have speakers but require headphones to be audible. The stereo equipment is converted to a traveling unit for a bicycle by securely mounting it to the carrier, which is already mounted to the bicycle handlebars, and coupling the audio output to the carrier speakers, in place of the headphones, thereby providing the output sound. Many small audio devices do have their own speakers, for which the carrier speakers are substituted when plugged into the headphone jack receptacle.

It is possible that an additional battery could be used for supplemental power. A cavity could be formed in surface 36 to hold the battery, an example of which is shown in FIG. 9. Appropriate electrical connections are within the skill in the art.

The embodiment of FIG. 9 includes an auxiliary battery and supplemental amplification circuits associated with each speaker. Battery 72 resides in recess 73. Amplifier circuit boards 74, 75 may be mounted in respective mating slots 76, 77 in speaker enclosures 81, 82. Appropriate electrical wiring is shown, together with the necessary apertures and grooves in main body 83 for passage of the wires.

With this configuration, the audio power of a small portable piece of audio equipment can be greatly enhanced. This allows a small, low power apparatus to provide the stereo sounds desired by the cycle rider.

Note that in this configuration speaker enclosures 89 and 90 are directly adjacent to and are effectively continuations of audio equipment receiving surface 84, and that they decline at a shallow angle therefrom. As is true of the FIG. 1 configuration, when surface 84 is horizontal, the speakers are tilted toward the rider.

A preferred shock absorbing pad 85 is also shown in FIG. 9 as well as in FIG. 10. This pad is resilient, made of thermoplastic or rubber, with raised bubbles. It is a very efficient shock absorber and provides excellent frictional contact with the audio equipment.

A novel strap and buckle assembly is shown in FIGS. 10-17. For reference purposes, the configuration of the carrier of FIG. 10 corresponds to that of FIG. 9. Strap 86 is preferably made of transparent, somewhat elastic, thermoplastic or rubber material. The two piece, adjustable, plastic buckle assembly is formed of anchor element 87 and wedging slide 88. The releasable end 91 of the strap is formed with a series of spaced, transverse raised ridges 92 for incremental, positive anchoring of the strap to the buckle. Fixed end 80 of the strap is configured to snap into slot 79 in main body 83. It is formed with an enlarged stop element 98 and a groove 99 which engages the edges of the slot. Smaller enlarged portion 100 completes the locking configuration.

Figure 11:
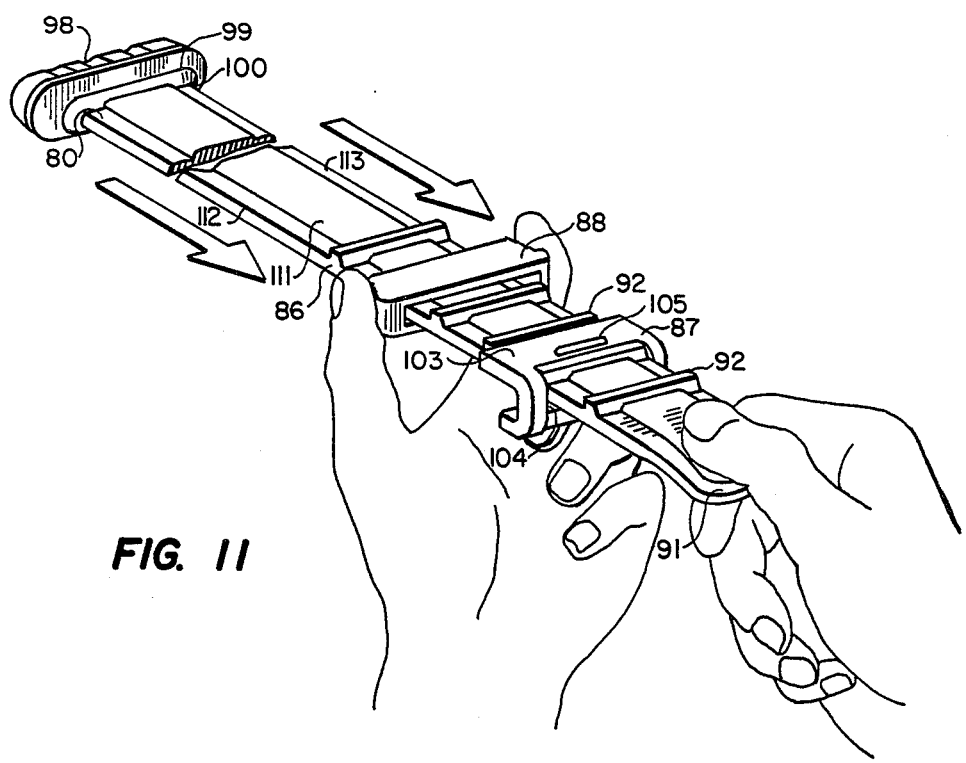
FIG. 11 is an enlarged perspective detail of the strap of FIG. 10.
Figure 12:
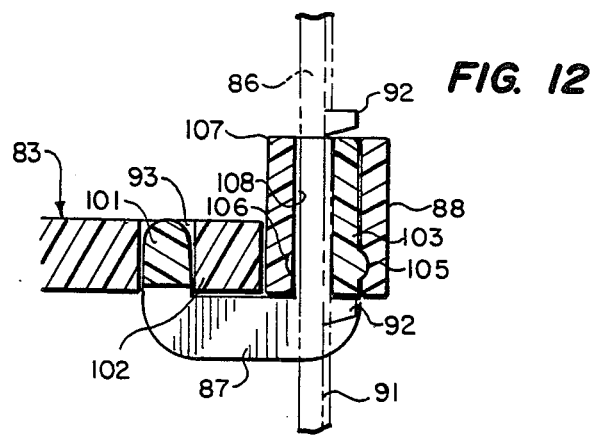
FIG. 12 is a sectional view of the buckle and strap in engaged position on the carrier as in FIG. 10.

From FIGS. 10-14 it is seen that anchor element 87 engages the main body and end 91 of the belt passes through the anchor element. There are two ways in which the anchor element engages the main body. In FIGS. 10 and 12 it is shown with side 101 entering slot 93 and main body bar 102 being surrounded on three sides by the anchor element. Bar 102 is closely adjacent side 101 and is spaced from anchor element side 103. End 91 of belt 86 passes freely through opening 104 in the anchor element. When the belt is moved against side 103, two adjacent ridges 92 closely engage the opposite edges of that side.

Figure 14:
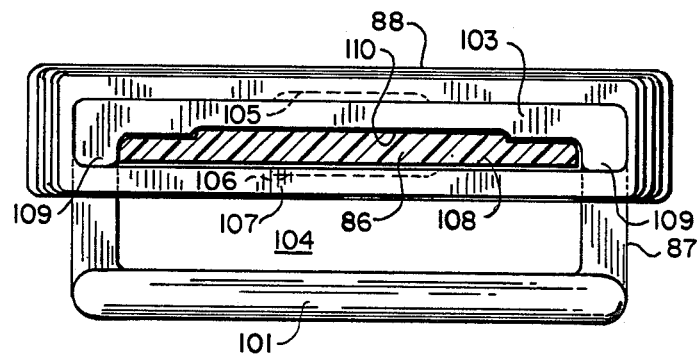
FIG. 14 is an end view of the buckle and strap combination of FIGS. 10-13.
Figure 15:
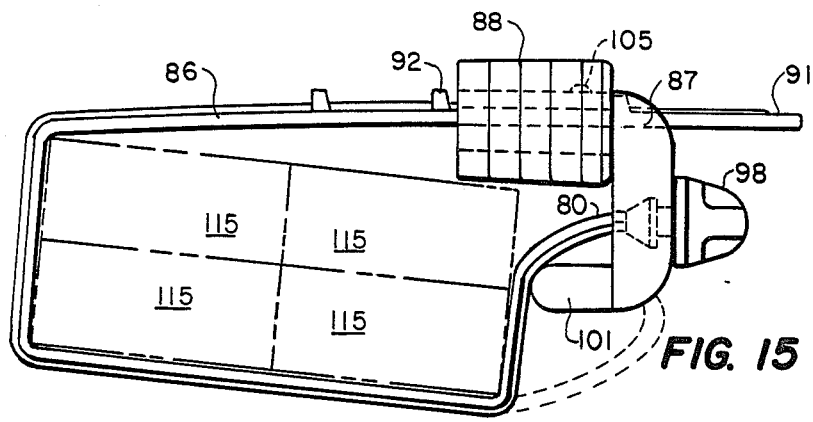
FIG. 15 shows the strap and buckle assembly of FIG. 11 as a unitary interconnectable combination to couple other items together.
Figure 16:
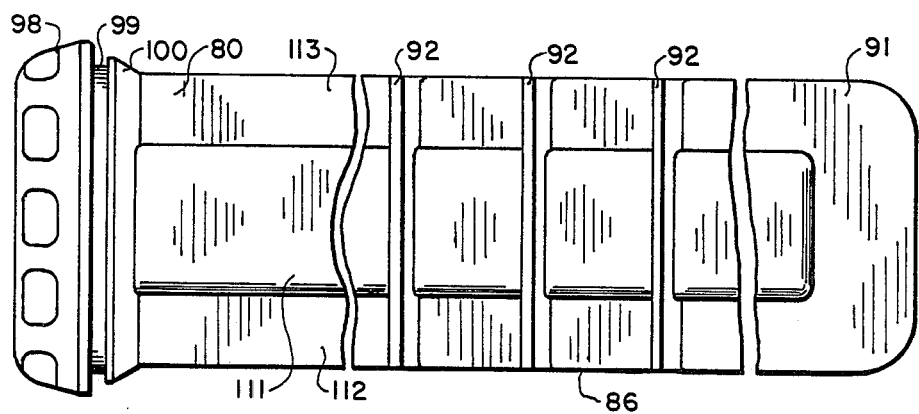
FIG. 16 is a top of view of the strap of FIG. 11.
Figure 17:
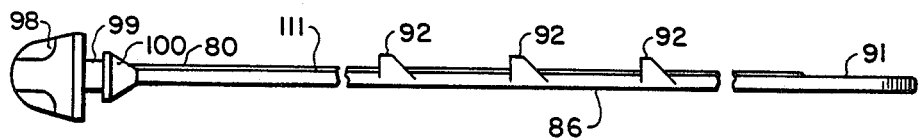
FIG. 17 is a side view of the strap of FIG. 16.

Referring to FIGS. 11, 12 and 14, it can be seen that wedging slide 88 has a central slot or opening 108 substantially equal to or slightly less than the combined thickness of strap 86 plus side 103 of the anchor element. The slide is slid or forced over anchor side 103 and strap 86, with rib 105 engaging mating depression 106 on the inside of the slide. This provides a positive but easily releasable engagement of the belt and buckle elements. Of course, these engaging elements may be reversed. At this point, side 107 of the slide substantially fills the gap between bar 102 and the strap in the anchor element. Similarly, the inside surface of side 107 of the slide contacts parallel side projections 109 on the anchor element (FIG. 14) which project toward side 101 a distance equal to the thickness of the belt.

With the tension normally on strap 86 when it is stretched to hold audio equipment onto main body 83, the combination of strap, buckle and main body as shown in FIG. 12 provides a very secure means to keep the audio equipment in place. However, because the buckle members are plastic and somewhat flexible, they may be intentionally disengaged relatively easily. Because of their construction, it is unlikely that vibrations due to normal riding of the bicycle will cause disengagement.

Another feature of the strap which makes unintended disengagement of the buckle or slippage of the strap therefrom unlikely is the fact that the longitudinal center portion 111 of the strap is substantially thicker than are the flanking longitudinal edges or margins 112, 113. The additional thickness may be between one-third and three-quarters that of the margins. This configuration, with thinner margins, permits the desired elasticity, but the thicker center prevents possible creep of the strap under tension. Thus it is not possible for even an over-tensioned strap to pull a rib 92 through the slot between side 107 of the slide and side 103 of the anchor element. The thicker center portion also contributes to a tighter engagement between the strap and the buckle elements, resulting in a compressive, wedging action when the slide engages the anchor element.

Figure 13:
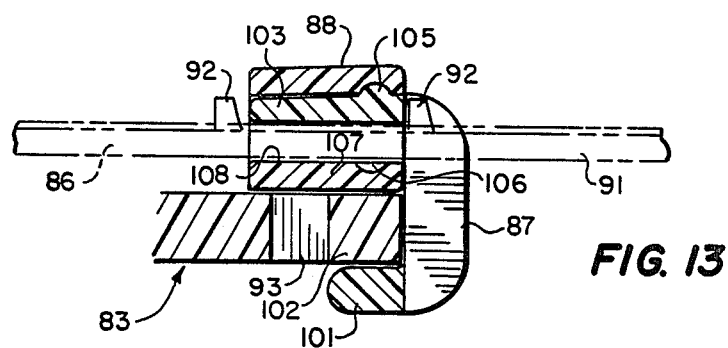
FIG. 13 is a sectional view similar to FIG. 12 with the buckle in an alternative engaged position on the carrier.

An alternative engagement of the strap with the buckle to main body 83 is shown in FIG. 13. The anchor element is turned 90° with respect to bar 102. The bar is approximately square in cross section so the buckle assembly engages it in the same manner except that side 101 of the anchor element does not extend into slot 93 in the main body.

The arrangement of FIG. 13 is particularly useful for very thin audio equipment, sometimes referred to as "credit card" size. By engaging the main body of the carrier in this fashion, the belt is brought down very close to padded top surface 84 so that it can frictionally hold in place even the thinnest audio equipment.

The end view of FIG. 14 shows how the three strap and buckle elements fit closely together. Opening 104 in anchor element 87 has sufficient depth to allow strap 86 to slide freely, with ridges 92 clearing the underside of side 103. When the desired engagement position is reached, the strap is moved against side 103 so that adjacent ridges 92 flank either edge of side 103, as discussed above, and wedging slide 88 is moved into position to secure the strap to the anchor element. Longitudinal groove 110 in the anchor element accommodates the strap so that the combined thickness of side 103 and the strap is closely engaged by slide 88. Sides or projections 109 form the strap receiving portion of the anchor element and are somewhat thicker than the main thickness of side 103 for added strength.

Although the strap and buckle arrangement of FIGS. 10–13 has been described with respect to its function with the subject carrier for audio equipment, it could be used for many other purposes where a positively secured strap with an easily releasable buckle would be advantageous. With the strap elongated and under tension it functions to best advantage, but the strap and buckle combination can perform adequately without strap elongating tension. For the particular use disclosed it is desirable that the strap be transparent. However, there are many other possible uses where it could be opaque without any resulting disadvantage.

An advantage of the strap and buckle arrangement of FIGS. 10–14 is that the audio equipment can be fastened and released with one hand. Further, because it is transparent, it is possible to visually determine the remaining cassette tape length, as well as seeing and operating important push button controls of the audio equipment that might be positioned under the strap.

It should be noted that although end 80 of strap 86 is shown in FIG. 11 as spaced from the buckle assembly, it could be permanently or removably connected thereto and be a combined strap and buckle (FIG. 15) that wraps entirely around the objects 115 to be secured together, similar to the strap of the FIG. 1 embodiment. In that case, anchor element 87 could be formed with a slot so that end 80 of the strap could be removably secured thereto. Alternatively, the strap end could be fixed to the anchor element as shown by the dotted lines in FIG. 15. Any appropriate means could be used to secure the strap to the anchor element.

Another alternative for securing the audio equipment to the carrier is that the strap could be one or more narrow bands anchored at either end to the main body and extending over the audio equipment. The anchoring elements could be either of the types disclosed herein, or other suitable configuration.

The function of any version of the strap is to hold two or more objects together, and more specifically in FIGS. 1 and 10, to frictionally hold the audio equipment in place on the carrier surface, the surface normally being covered by a shock absorbing pad.

In view of the above description, it is likely that modification and improvements will occur to those skilled in the art which are within the scope of the claims.

We claim:

1. A carrier for coupling self contained and powered, portable audio equipment to vehicles having handlebars affixed to a fork control arm, said carrier comprising:
   a main body including a pair of spaced-apart speaker enclosures and a platform;
   means for removably mounting said main body to a portion of said handlebars in a postion centered laterally with respect to said fork control arm and with the center of gravity closely adjacent to said handlebars;
   said pair of speaker enclosures extending rearwardly of said handlebar portion toward a rider on said vehicle;
   an electric signal-to-audio transducer in each said speaker enclosure;
   amplifier means connected between at least one of said transducers and the audio equipment;
   said platform extending forwardly of said handlebars away from the rider and adapted to receive the audio equipment of a variety of sizes thereon;
   means for releasably securing the audio equipment to said platform; and
   means for communicating electric signals from the audio equipment to said transducers, said electric signals representing audio sounds and being generated by the audio equipment;
   said carrier, when the audio equipment is mounted thereto, being shaped and configured to be substantially longitudinally balanced with respect to said mountinq means.

2. The carrier recited in claim 1, wherein said carrier is shaped and configured so that when it is mounted to a vehicle, said speaker enclosures are adapted to extend rearwardly on either side of said fork control arm.

3. The carrier recited in claim 2, wherein said audio equipment receiving means is wider than the spacing between said speaker enclosures, whereby stereophonic effect is achieved with the width of said carrier being minimally increased beyond that necessary to retain the audio equipment and remain clear of said stem.

4. The carrier recited in claim 1, wherein said platform means is a substantially planar surface defining the top of said main body.

5. The carrier recited in claim 4, and further comprising a shock absorbing pad on said surface.

6. The carrier recited in claim 5, wherein said pad partially surrounds the audio equipment and is partially held in place by said releasable securing means.

7. The carrier recited in claim 5, wherein said pad is made of a resilient material providing enhanced frictional contact with the audio equipment.

8. The carrier recited in claim 7, wherein said pad is made of a thermoplastic.

9. The carrier recited in claim 4, wherein when said carrier is in use, said speaker enclosures are declined from the plane of said surface to facilitate projection of the sounds toward the vehicle operator.

10. The carrier recited in claim 1, wherein said releasable securing means comprises strap means adapted to frictionally and positively engage the audio equipment.

11. The carrier recited in claim 10, wherein said strap means is adapted to wrap around the audio equipment and said audio equipment receiving means and to be securely coupled together at its ends.

12. The carrier recited in claim 11, wherein said strap means comprises:
an elongated strap made from elastic material;
buckle means on one end of said strap;
the other end of said strap being shaped and configured to
be securely engaged by said buckle means.

13. The carrier recited in claim 12, wherein said buckle means comprises:
an anchor element secured to said one end of said strap; and a wedging slide configured to hold said strap and said anchor element together.

14. The carrier recited in claim 12, wherein said other end of said strap is formed with spaced transverse ridges adapted to engage said anchor element.

15. The carrier recited in claim 14, wherein said anchor element is formed with means adapted to be engaged by two adjacent said transverse ridges, said slide being adapted to hold said transverse ridges of said strap in positive engagement with said anchor element.

16. The carrier recited in claim 12, wherein said strap has a central longitudinal portion which is thicker than the marginal flanking portions, thereby limiting the longitudinal flexibility of said strap.

17. The carrier recited in claim 16, wherein when said wedging slide mutually engages said strap and said anchor element, said thicker central portion is compressively wedged between said slide and said anchor element.

18. The carrier recited in claim 12, wherein one of said anchor element and wedging slide is formed with a protrusion and the other is formed with a mating depression, whereby when said buckle elements are engaged said protrusion and said depression provide positive retention means.

19. The carrier recited in claim 18, wherein because of their inherent flexibility, said wedging slide may be removed from said anchor element with one hand to thereby release said strap.

20. The carrier recited in claim 10, wherein said strap means comprises an elongated element with its two ends equipped with mating hook and pile fastener means, adapted to wrap around said platform and the audio equipment.

21. The carrier recited in claim 10, wherein said strap means is comprised of substantially transparent elastic material.

22. The carrier recited in claim 10, wherein said strap means is comprised of elastic material.

23. The carrier recited in claim 1, wherein said means for removably mounting said carrier to said handlebars comprises clamp means configured to accommodate handlebar tubing of different sizes.

24. The carrier recited in claim 23, wherein said clamp means comprises a clamp on either side of said main body adjacent each of said speaker enclosures, each said clamp having a removable portion to permit rotational and lateral adjustability with respect to said handlebars and removal of said carrier from said handlebars.

25. The carrier recited in claim 23, wherein said main body is substantially forward of said clamp means and said speaker enclosures are substantially rearward of said clamp means.

26. The carrier recited in claim 1, wherein said amplifier means is connected between each said transducer and the audio equipment.

27. The carrier recited in claim 26, wherein one said amplfier means is located within each said speaker enclosure.

28. The carrier recited in claim 26, and further comprising auxiliary battery means connected between the audio equipment and said amplifier means.

29. The carrier recited in claim 28, wherein said main body is formed with a cavity for receiving said auxiliary battery.

30. The carrier recited in claim 28, wherein said auxiliary battery is positioned in said main body beneath said audio equipment receiving means.

* * * * *